United States Patent [19]
Grace et al.

[11] Patent Number: 6,113,975
[45] Date of Patent: Sep. 5, 2000

[54] PROCESSES FOR THE MODIFICATION OF WHEAT GLUTEN

[75] Inventors: Geoffrey E. Grace, Epping; Guo-Sui Ye, Bomaderry, both of Australia

[73] Assignee: Shoalhave Starches Pty Ltd, Bomaderry, Australia

[21] Appl. No.: 08/677,047

[22] Filed: Jul. 1, 1996

Related U.S. Application Data

[60] Provisional application No. 60/000,890, Jul. 6, 1995.

[51] Int. Cl.[7] .................................. A23J 1/00; A23L 1/28
[52] U.S. Cl. .......................... 426/656; 426/425; 426/429
[58] Field of Search .................................... 426/656, 425, 426/429

[56] References Cited

U.S. PATENT DOCUMENTS 3,840,515 10/1974 Reiners et al. .
4,486,343 12/1984 Walker et al. .

FOREIGN PATENT DOCUMENTS

| 0 164 929 | 5/1995 | European Pat. Off. . |
| 2 657 034 | 6/1977 | Germany . |
| WO 96/03890 | 2/1996 | WIPO . |

OTHER PUBLICATIONS

Database Abstract. FSTA. AN: 78(09):M0816. Cereal Chemistry, 54(6), pp. 1198–1206. Author: Clements, 1977.
Database Abstract. Derwent Account No. 1993–410242. JP 05309261. Patent Assignee: ASAMA KASEI KK, Nov. 1993.
Wang et al., Preparation of Molecular Microcapsules of Alcohol–Soluble Wheat Protein, Chemical Abstracts, vol. 124, No. 1, 124:4500q, p. 489 (1996).
M. Yajima, Manufacture of Microcapsules Using Wheat Protein, Chemical Abstracts, vol. 120, 120:167971a, p. 230 (1994).
Byers et al., A Quantitative Comparison of the Extraction of Protein Fractions from Wheat Grain by Different Solvents, and of the Polypeptide and Amino Acid Composition of the Alcohol–soluble Proteins, J. Sci. Food Agric., vol. 34, No. 5, pp. 447–462 (1983).
Miflin et al., The Isolation and Characterisation of Proteins Extracted from Whole Milled Seed, Gluten and Developing Protein Bodies of Wheat, Ann. Technol. Agric., vol. 29, No. 2, pp. 133–147 (1980).
Database abstract. Derwent WPI Account No. 72–62491T/197239. JP 47037544 published Mar. 9, 1972. Patent Assignee Chiba Seihun KK.
Batey et al., Solubilization of Wheat Gluten With Sodium Hydroxide, J. Fd Technol. vol. 16, pp. 561–566 (1981).
J. W. Finley, Deamidated Gluten: A Potential Fortifier For Fruit Juices, Journal of Food Science, vol. 40, pp. 1283–1285 (1975).

*Primary Examiner*—Anthony J. Weier
*Attorney, Agent, or Firm*—Finnegan, Henderson, Farabow, Garrett & Dunner L.L.P.

[57] ABSTRACT

The invention provides a method for reducing the fat content of wheat gluten or wheat protein isolates. In one embodiment, the gluten or W.P.I. is treated with a monohydric alcohol for a temperature and a time sufficient to remove lipids. In a particularly preferred embodiment, the gluten or W.P.I. is treated with acidified alcohols. The resulting fat-reduced gluten or W.P.I. exhibits superior functional and sensory properties.

11 Claims, No Drawings

PROCESSES FOR THE MODIFICATION OF WHEAT GLUTEN

This application claims the benefit of U.S. Provisional application Ser. No. 60/000,890, filed Jul. 6, 1995.

BACKGROUND

Baked bread, a staple of the western world, is one of the oldest products manufactured from naturally occurring raw materials. Indeed, its basic ingredients, processes, and characteristics have changed little since the Stone Age.

Bread is made by mixing flour, water, salt, and yeast and kneading the mixture into a homogeneous mass which is then cooked or baked. Other ingredients are optional but greatly add to the character of the final product. One significant ingredient, wheat gluten, has traditionally been used as a protein additive in certain yeast-raised baked goods.

Wheat gluten is a complex mixture of proteins (75–80%), starch (15–20%), and fat (5–7%). The two main proteins are gliadin and glutenin. Gliadin gives gluten elasticity while glutenin gives it strength. Together, the proteins permit yeast-raised breads to maintain carbon dioxide gas produced during fermentation and thereby result in breads with a desired predetermined volume.

Gluten, however, has poor emulsifying activity and is largely insoluble in water at neutral pH. These characteristics have severely limited the use of gluten to a relatively small class of applications.

Various methods have been investigated and proposed to modify wheat gluten, including the production of a protein isolate from gluten by the removal of starch. These isolates, termed "wheat protein isolates" (W.P.I.), exhibit increased protein levels, 87–89% protein [N×5.7 dry basis].

These modification methods include attempts to increase gluten solubility in water by removing primary amides from glutamine and asparagine residues. In one process, wheat gluten is treated with alkaline chemicals at varying times and temperatures. The products have improved functional properties, but may also contain short chain peptides which, by their chemical nature and sequences, can impart a bitter taste to the modified gluten. Moreover, alkaline treatment saponifies the residual fats present in gluten, resulting in unpleasant soapy flavor and odor. Batey & Gras (1981) Journal Food Technology 16 561–566.

Another known process uses acids to effect full or partial deamidation of the side chains of gluten. Although some claim that these processes result in improved solubility, emulsification and whipping properties, the processes may also result in products which have unpleasant odors and bitter flavors, like those from alkaline modification processes.

Acid deamidation is also known to hydrolyze the wheat starch component of wheat gluten, a beneficial process that increases the concentration of functional protein content to a minimum 86%–87% protein [N×5.7 dry basis]. At the same time, however, acid deamidation exposes the fats in gluten to the rapid onset of oxidative rancidity. This effect makes the process commercially nonviable for food applications. J W Finley (1975) Journal Food Science 40 1283; Yagi et al (1985) European Patent No. 0164929.

Other attempts to modify gluten involve controlled enzyme hydrolysis by protease enzymes to achieve a range of solubilities and functionality. Enzymes can be from microbial, vegetable, or animal sources, and may be used under acid, neutral, or alkaline conditions.

Increased water solubility does generally result from most enzymatically modified glutens, but there is often a large reduction in molecular weight of the enzyme-hydrolysed glutens. In addition, the reaction products frequently contain low molecular weight peptides, including hydrophobic amino acids, which have an unpleasant bitter flavor.

Although some improvements in gluten functionality characteristics have been noted with these gluten modifications, such modifications are known to result in products which possess unacceptable flavor and odor. Indeed, artisans had produced and sold W.P.I. in the 1980's, but the W.P.I. exhibited such a level of undesirable fat rancidity that production was discontinued. Attempts to remove the offending fats were unsuccessful, likely due to the substantial bond between the fats and protein matrix. Thus, there remains in the art a need for a method to modify wheat gluten and to produce wheat protein isolates with satisfactory flavor and the desired functionality.

SUMMARY OF THE INVENTION

The invention provides a method for reducing the fat content of wheat gluten or of wheat protein isolates. In one embodiment, the gluten or W.P.I. is treated with a monohydric alcohol at a temperature and for a time sufficient to remove lipids. Preferred alcohols include methanol and ethanol. In a particularly preferred embodiment, the gluten or W.P.I. is treated with acidified alcohols. The resulting fat-reduced gluten or W.P.I. exhibits superior functional and sensory properties.

DETAILED DESCRIPTION OF THE PREFERRED EMBODIMENTS

The invention provides a method for reducing the fat content of the protein of wheat gluten from its original percentage of about 6% to a residual fat content ranging from 0.05% to 0.25%.

The gluten may be obtained by any means standard in the art, such as aqueous extraction of wheat flour. In a preferred embodiment, the gluten is dry vital gluten. In another embodiment, the gluten is dry deamidated gluten that has been previously treated to remove the primary amides from the glutamine and asparagine residues. Any method known in the art for deamidation, such as acid deamidation or enzyme hydrolysis, may be used here and is not a limitation of the invention. In another embodiment, the product subjected to the fat reduction process is wheat protein isolate ("W.P.I.") made by techniques known in the art such as deamidation.

One embodiment of the invention provides a process for modifying gluten or W.P.I. by treating the gluten or W.P.I. with a monohydric alcohol. Any monohydric alcohol may be used to treat the gluten or W.P.I. Certain preferred alcohols include methanol, ethanol, butanol and isopropanol.

In a more preferred embodiment, the treatment includes using acidified alcohol in which the alcohol phase also contains a mineral acid. It has been found that alcohol alone cannot remove all fats bound into the protein matrix. Alcohol extraction alone generally reduces total fat content from 6% to about 1.5%. The inventors discovered that acidified alcohol will remove fats down to a residual ranging from 0.05% to 0.25%, preferably 0.15%. Moreover, acidified alcohol also removes color pigments, leading to a very pleasing light colored product.

Examples of acids used according to the present invention include hydrochloric acid, sulphuric acid, phosphoric acid, or any organic acid such as acetic acid, lactic acid, tartaric acid, citric acid, or any combination of such acids. A preferred acid concentration is acid at 1% by volume or higher of the alcohol volume. Such an acid concentration corresponds to a pH of less than 5.0, preferably between 1.5 and 3.0.

The alcohol or acidified alcohol treatment is preferably carried out for a time sufficient to remove lipids. Any temperature greater than 20° C. may be used, but a more preferred temperature ranges between 70° C. and 80° C.

Any time greater than five minutes may be used, but a preferred range is between 30 minutes and 1 hour, although this time may be extended.

It has been surprisingly found that the fat reduction procedure when used on unmodified wheat gluten also produces partial deamidation of the primary amine residues of asparagine and glutamine, leading to improved emulsification, whipping and solubility properties.

The fat-reduced gluten or W.P.I. produced according to the invention may be further processed by any one or all of the following unit operations in any order, Filtration, Desolventising, Acid Hydrolysis, Activated Carbon Treatment, Protease Enzyme Hydrolyses, Ion Exchange, Protein Curd Precipitation and Decantation, Curd Washing, Flash Drying, Spray Drying, Roller Drying, Fluid Bed Drying, Extrusion Processing or drying on a carrier. Such techniques are very well known in the art. See, for example, *Perry's Chemical Engineering Handbook* 6th Ed. 1988.

The fat-reduced gluten or fat-reduced W.P.I. produced by the invention may be used as a valuable soluble protein source in foods. In one embodiment, they are used as replacements for the more expensive casein and caseinates. In a preferred embodiment, the reduced-fat products may be used as a replacement for skim milk or to prepare filled milks. In another preferred embodiment, they may be used to manufacture beverage whiteners. In yet another embodiment, they may be used in the production of imitation cheeses. In a still further embodiment, they may be used to replace casein in formulations for paper coatings, and also to provide improved binding and humidity resistant qualities to paper and board.

The invention will be further clarified by the following examples, which are intended to be purely exemplary.

EXAMPLE 1

The following procedure represents a preferred process for obtaining a modified wheat protein isolate using a batchwise process.

Dry, Vital Wheat Gluten obtained by aqueous extraction was blended into undenatured ethyl alcohol in the ratio of 1 part gluten solids to 3 parts anhydrous ethyl alcohol by weight. Hydrochloric acid (32%) was added in the ratio of 30 parts HCl per 1000 parts ethyl alcohol.

The acidified ethyl alcohol/wheat gluten mixture was then heated to a temperature of 75° C. using heating coils in an extraction tank for 60 minutes. The treated gluten was recovered by filtration and washed with fresh ethyl alcohol to remove residual extraction solvent and to cool the product, a substantially fat free, partly modified gluten. Thereafter, the gluten was heated in a desolventiser to remove residual ethyl alcohol to produce a free flowing light colored, low fat protein concentrate.

To further deamidate the protein concentrate, it was blended with cold water at a ratio of 20 parts powder to 100 parts water. Hydrochloric acid was added to achieve a pH value of 1.1–1.2. This acidified protein slurry was then heated in a direct steam injection cooker to 105° C.–120° C., and maintained at the selected temperature for seven minutes. The cooking process completed the deamidation process and solubilized both protein and starch.

The hot, soluble liquor from the cooker was then screened to remove insoluble material (fiber) and cooled in a heat exchanger to 50° C.–55° C. Sodium hydroxide was added to adjust pH to the isoelectric point of the wheat protein isolate, 4.4–4.6. This precipitated the wheat protein as a protein curd which was recovered using a decanter centrifuge. The overflow from the decanter was mostly soluble starch. Removal of the starch fraction increased the protein content of the wheat protein to the desired level of 88% [N×5.7 dry basis], necessary to qualify as a wheat protein isolate.

The protein curd was washed to remove all residual salts generated in the neutralization process and further processed by ion exchange and activated carbon to improve color and odor. The purified protein curd was then flash dried or spray dried to produce a modified W.P.I. with excellent functional properties.

EXAMPLE 2

This example represents a preferred process for obtaining a modified wheat protein isolate using a continuous process.

Dry powdered Vital Wheat Gluten obtained from aqueous extraction of wheat flour was continuously metered into a countercurrent extraction apparatus of a type in common use in the oilseed extraction industry. Hot [75° C.] acidified ethyl alcohol in the proportions indicated in Example 1 was fed into the extractor in countercurrent flow to the gluten. Residence time in the extractor was controlled to provide an extraction time of preferably 20 to 60 minutes, although longer times may be used.

The extracted gluten carried some 30% to 40% residual ethyl alcohol, which was removed in a desolventising plant. The solvent-free protein was reslurried in water, acidified to pH 1.1 to 1.2 and processed as indicated in Example 1.

EXAMPLE 3

This example provides a method of converting wheat gluten to wheat protein isolate without first carrying out the fat-reduction procedure described in Examples 1 and 2.

Dry, full fat wheat protein isolate in isoelectric or soluble salt form, obtained by deamidation of wet or dry wheat gluten, was subjected to the fat-reduction procedure described in Examples 1 and 2. After desolventising, such a process yielded similar functional wheat protein isolates as Examples 1 and 2.

EXAMPLE 4

The fat-reduced W.P.I. can be used to prepare a replacement for skim milk. One version comprises a dry blend of 30% W.P.I. and 70% demineralized Sweet Whey Powder. Another version comprises a dry blend of:

| | |
|---|---|
| W.P.I. | 20% |
| Corn Syrup solids | 20% |
| Maltodextrin | 31% |
| Whey Protein Isolate | 20% |
| Edible Lactose | 9% |

Both dry blends may be combined with water to produce a flavorful replacement for skim milk.

EXAMPLE 5

The fat-reduced W.P.I. may also be used to produce beverage whiteners based on the following:

| | |
|---|---|
| Water | 40% |
| W.P.I. (Sodium Form) | 1.8% |
| Maltodextrin | 35% |
| Hydrogenated Vegetable Fat | 21% |
| Di Potassium Phosphate | 1.2% |
| Emulsifiers | 1.0% |

First melt vegetable oil and emulsifiers together. Heat to 160° F. Then dissolve dipotassium phosphate in water. Add W.P.I. with high shear mixing. Blend in maltodextrin. Add the fat/emulsifier mixture, pasteurize, homogenize and spray dry.

The sodium form of W.P.I. is W.P.I. treated with sodium hydroxide or other water soluble alkaline sodium salt. An alternative form of W.P.I. is the calcium form of W.P.I. which is treated with calcium hydroxide.

The emulsifier used is diacetyl tartaric acid ester of mono and diglycerides, although any suitable emulsifier may be used.

The mixture is then pasteurized, homogenized, and spray dried.

EXAMPLE 6

The fat-reduced W.P.I. of the invention may be used to prepare filled milks based on the following:

| | |
|---|---|
| W.P.I. (Sodium Form) | 3.5% |
| Lactose | 5% |
| Hydrogenated Vegetable Fat | 3.5% |
| Sodium Chloride | 0.2% |
| Carrageenan | 0.01% |
| Emulsifier | 0.02% |
| Potassium Phosphate Mix | 0.10% |
| Water | 87.67% |

First melt fat and emulsifier together, then blend the dry ingredients into the water at 140° F. Mix water solution and fat/emulsifier portions together. Pasteurize and homogenize. Cool to 40° F. and store until required. The sodium form of W.P.I. is W.P.I. treated with sodium hydroxide, or other water soluble alkaline sodium salt. An alternative form of W.P.I. is the calcium form of W.P.I. which is treated with calcium hydroxide. The emulsifier used is diacetyl tartaric acid ester of mono and diglycerides, although any suitable emulsifier may be used.

Water is added to the blend to dilute it to 40%. The mixture is then pasteurized, homogenized, and spray dried.

EXAMPLE 7

The fat-reduced W.P.I. of the invention may be used to prepare imitation cheeses. One embodiment comprises the following ingredients:

| | |
|---|---|
| W.P.I. | 26.2% |
| Hydrogenated Vegetable Oil | 24.5% |
| Water | 45.45% |
| Sodium Chloride | 1.80% |
| Citric Acid | 0.90% |
| Sodium Citrate | 0.40% |
| Disodium Phosphate | 0.75% |
| Flavour and Colour | QS |

Prepared as follows:
1. Dissolve sodium chloride, sodium citrate and disodium phosphate in 75% of the water and heat to 160° F.
2. Dissolve citric acid in 12.5% of the water to form an acid solution.
3. Heat vegetable oil to 212° F.
4. Blend W.P.I. into heated vegetable oil until powder is thoroughly coated with oil.
5. Add the salt water and mix at medium speed for 1.5 minutes;
6. Add acid solution and mix for 2.0 minutes;
7. Add remaining 12.5% of water and mix 1.0 minute; and
8. Pour mixture into mold and refrigerate overnight.

EXAMPLE 8

The fat-reduced W.P.I. may also be used to produce powdered shortening, comprising:

| | |
|---|---|
| W.P.I. (sodium form) | 20% |
| Hydrogenated Vegetable or Animal Fat | 79% |
| Emulsifier | 1.0% |

The sodium form of W.P.I. is W.P.I. treated with sodium hydroxide, or any water soluble alkaline sodium salt. An alternative form of W.P.I. is the calcium form of W.P.I. which is treated with calcium hydroxide. The emulsifier used is diacetyl tartaric and ester of mono and diglycerides, although any suitable emulsifier may be used.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for reducing the fat content of wheat gluten comprising:
   obtaining wheat gluten and treating the gluten with a monohydric alcohol and a mineral acid at a temperature and for a time sufficient to remove lipids from the gluten to produce a fat-reduced wheat gluten.

2. The method of claim 1 wherein the monohydric alcohol is selected from the group consisting of methanol and ethanol.

3. The method of claim 1 wherein the mineral acid is selected from the group consisting of:
   hydrochloric acid, sulphuric acid, and phosphoric acid.

4. The method of claim 3 wherein the acid is at least 1% by volume of the alcohol.

5. The method of claim 1 wherein the gluten is selected from the group consisting of dry vital wheat gluten and deaminated wheat gluten.

6. The method of claim 1 wherein the temperature is greater than 20° C.

7. The method of claim 6 wherein the temperature ranges from 70° C. to 80° C.

8. The method of claim 6 wherein the treatment time is greater than 5 minutes.

9. The method of claim 8 wherein the treatment time ranges from 30 to 60 minutes.

10. A method for producing a fat-reduced wheat protein isolate, comprising:

obtaining wheat gluten;

treating the gluten with an acidified monohydric alcohol at a temperature and for a time sufficient to remove lipids from the gluten to produce a fat-reduced wheat gluten; and processing the fat-reduced wheat gluten to produce a fat-reduced wheat protein isolate.

11. A method for reducing the fat content of wheat protein isolates, comprising:

obtaining a wheat protein isolate and treating the wheat protein isolate with an acidified monohydric alcohol at a temperature and for a time sufficient to remove lipids from the wheat protein isolate to produce a fat-reduced wheat protein isolate.

* * * * *